United States Patent
Dayan et al.

(10) Patent No.: US 11,349,520 B2
(45) Date of Patent: May 31, 2022

(54) GENERATION OF MILLIMETER-WAVE FREQUENCIES FOR MICROWAVE SYSTEMS

(71) Applicant: Siklu Communication Ltd., Petah Tikva (IL)

(72) Inventors: Elad Dayan, Beit-Dagan (IL); Yigal Leiba, Holon (IL)

(73) Assignee: Siklu Communication Ltd., Petach-Tikva (IL)

( * ) Notice: Subject to any disclaimer, the term of this patent is extended or adjusted under 35 U.S.C. 154(b) by 179 days.

(21) Appl. No.: 16/942,920

(22) Filed: Jul. 30, 2020

(65) Prior Publication Data

US 2020/0358470 A1    Nov. 12, 2020

Related U.S. Application Data

(63) Continuation-in-part of application No. 16/389,966, filed on Apr. 21, 2019, now Pat. No. 10,778,277.

(51) Int. Cl.
*H04H 40/18*    (2008.01)
*H04B 1/28*    (2006.01)
(Continued)

(52) U.S. Cl.
CPC .............. *H04B 1/40* (2013.01); *H04L 25/022* (2013.01); *H04L 27/2697* (2013.01)

(58) Field of Classification Search
CPC . H04B 1/40; H04B 1/28; H04B 15/00; H04B 1/26; H04H 40/18; H04L 1/0003;
(Continued)

(56) References Cited

U.S. PATENT DOCUMENTS 6,542,722 B1    4/2003    Sorrells et al.
6,862,440 B2    3/2005    Sampath
(Continued)

FOREIGN PATENT DOCUMENTS

EP          1300956 A1    4/2003
JP       2008516537 A    5/2008
(Continued)

*Primary Examiner* — Pablo N Tran
(74) *Attorney, Agent, or Firm* — Active Knowledge Ltd.

(57) ABSTRACT

Systems and methods for generating a microwave signal using two millimeter-wave frequencies. A first millimeter-wave up-conversion frequency, which is generated from a lower frequency source, is used to up-convert a baseband and/or intermediate signal into a first millimeter-wave signal, which is then down-converted into a microwave signal using a second millimeter-wave down-conversion frequency generated from the same lower frequency source. Each of the first and second millimeter-wave frequencies is associated with a phase noise that is higher than a phase noise associated with the lower frequency source, however, the frequency differential between the first millimeter-wave frequency and the second millimeter-wave frequency is free of the higher phase noise, as a result of the two millimeter-wave signal being generated from the single lower frequency source, thereby causing the resultant microwave signal to be free of the higher phase noise as well.

16 Claims, 5 Drawing Sheets

(51) Int. Cl.
  *H04B 15/00* (2006.01)
  *H04B 1/26* (2006.01)
  *H04B 1/40* (2015.01)
  *H04L 25/02* (2006.01)
  *H04L 27/26* (2006.01)

(58) Field of Classification Search
  CPC ............... H04L 1/0026; H04L 27/2626; H04L 27/2647; H04W 52/262
  See application file for complete search history.

(56) References Cited

U.S. PATENT DOCUMENTS

| | | | |
|---|---|---|---|
| 7,002,511 | B1 | 2/2006 | Ammar et al. |
| 7,414,488 | B2 | 8/2008 | Lee et al. |
| 7,509,110 | B2 * | 3/2009 | Hayashi ............... H03D 7/1441 |
| | | | 455/302 |
| 7,769,347 | B2 | 8/2010 | Louberg et al. |
| 7,773,205 | B2 | 8/2010 | Cooper et al. |
| 7,825,741 | B2 | 11/2010 | Reynolds et al. |
| 7,904,029 | B2 | 3/2011 | Brady et al. |
| 7,933,524 | B2 * | 4/2011 | Park ....................... H04B 10/50 |
| | | | 398/201 |
| 8,195,117 | B2 | 6/2012 | Bult et al. |
| 8,212,718 | B2 * | 7/2012 | Utagawa ................. G01S 7/032 |
| | | | 342/28 |
| 8,339,208 | B2 | 12/2012 | Luong et al. |
| 8,527,003 | B2 | 9/2013 | Gupta et al. |
| 9,057,927 | B2 | 6/2015 | Hu et al. |
| 9,121,757 | B2 | 9/2015 | Herzinger |
| 9,178,504 | B2 | 11/2015 | Komori |
| 9,300,508 | B2 * | 3/2016 | Lovberg .............. H04L 27/2039 |
| 10,505,256 | B2 | 12/2019 | Charvat et al. |
| 10,620,138 | B2 * | 4/2020 | Neill ....................... G01N 22/00 |
| 2004/0012447 | A1 | 1/2004 | Nagaishi et al. |
| 2005/0243902 | A1 | 11/2005 | Robert et al. |
| 2006/0063483 | A1 * | 3/2006 | Suematsu ............... H04H 40/18 |
| | | | 455/3.02 |
| 2006/0273255 | A1 | 12/2006 | Volkov et al. |
| 2016/0099681 | A1 | 4/2016 | Zong et al. |
| 2017/0155531 | A1 | 6/2017 | Kawasaki |

FOREIGN PATENT DOCUMENTS

| | | |
|---|---|---|
| JP | 4965432 B2 | 7/2012 |
| JP | 6400730 B2 | 10/2018 |
| KR | 101475244 B1 | 12/2014 |

\* cited by examiner

GENERATION OF MILLIMETER-WAVE FREQUENCIES FOR MICROWAVE SYSTEMS

CROSS REFERENCE TO RELATED APPLICATIONS

This Application is a continuation-in-part of patent application Ser. No. 16/389,966, filed on Apr. 21, 2019.

BACKGROUND

A millimeter-wave frequency generated from a lower frequency source may be associated with an increased level of phase noise that may prove to be unusable in conjunction with microwave systems.

In wireless communication systems, such as microwave systems, a transmission signal is generated by up-converting a base-band signal into a microwave signal, in which such up conversion is done using a single or multiple up-conversion frequencies in the microwave range. Using up-conversion frequencies in the microwave range may interfere with the operation of other nearby or co-located microwave channels, and may further or otherwise restrict the span of frequencies over which transmission of microwave signals can be made.

SUMMARY

One embodiment (FIG. 4A, FIG. 4B) is a system operative to generate a specific exact frequency differential between a first millimeter-wave frequency and a second millimeter-wave frequency, comprising: a single oscillator; and a frequency alteration mechanism comprising at least a first frequency multiplier. In one embodiment, the system is configured to use the single oscillator in conjunction with the frequency alteration mechanism to generate a first millimeter-wave frequency that is above 18 GHz (eighteen gigahertz); the system is further configured to use the single oscillator, again, in conjunction with the frequency alteration mechanism to generate a second millimeter-wave frequency that is below the first millimeter-wave frequency but still above 18 GHz, so as to create a specific exact frequency differential between the first millimeter-wave frequency and a second millimeter-wave frequency, in which the first millimeter-wave frequency and a second millimeter-wave frequency are at least partially phase-correlated as a result of being generated from the single oscillator; and both said first millimeter-wave frequency and second millimeter-wave frequency are associated with a millimeter-wave phase noise that is above a certain noise level, however the specific exact frequency differential is associated with a phase noise that is below said certain noise level as a direct result of said phase-correlation, and is therefore usable for generating a certain signal associated with a certain baseband and/or intermediate frequency.

One embodiment (FIG. 5) is a method for generating a specific exact frequency differential between a first millimeter-wave frequency and a second millimeter-wave frequency, comprising: multiplying a frequency associated with a single microwave oscillator comprising a certain level of phase noise, thereby producing a millimeter-wave up-conversion frequency associated with a higher level of phase noise; multiplying a frequency associated with the single microwave oscillator, thereby producing a millimeter-wave down-conversion frequency associated with the higher level of phase noise; obtaining a first signal in a baseband and/or intermediate frequency; using the millimeter-wave up-conversion frequency to up-convert the first signal from said baseband and/or intermediate frequency into a millimeter-wave frequency, thereby producing a millimeter-wave version of the first signal that is associated with the higher level of phase noise; using the millimeter-wave down-conversion frequency to down-convert the millimeter-wave version of the first signal into a microwave version of the first signal; and phase-matching the millimeter-wave up-conversion frequency with the millimeter-wave down-conversion frequency, thereby reducing a phase noise associated with the microwave version of the first signal.

BRIEF DESCRIPTION OF THE DRAWINGS

The embodiments are herein described by way of example only, with reference to the accompanying drawings. No attempt is made to show structural details of the embodiments in more detail than is necessary for a fundamental understanding of the embodiments. In the drawings.

DETAILED DESCRIPTION

Figure 1A:
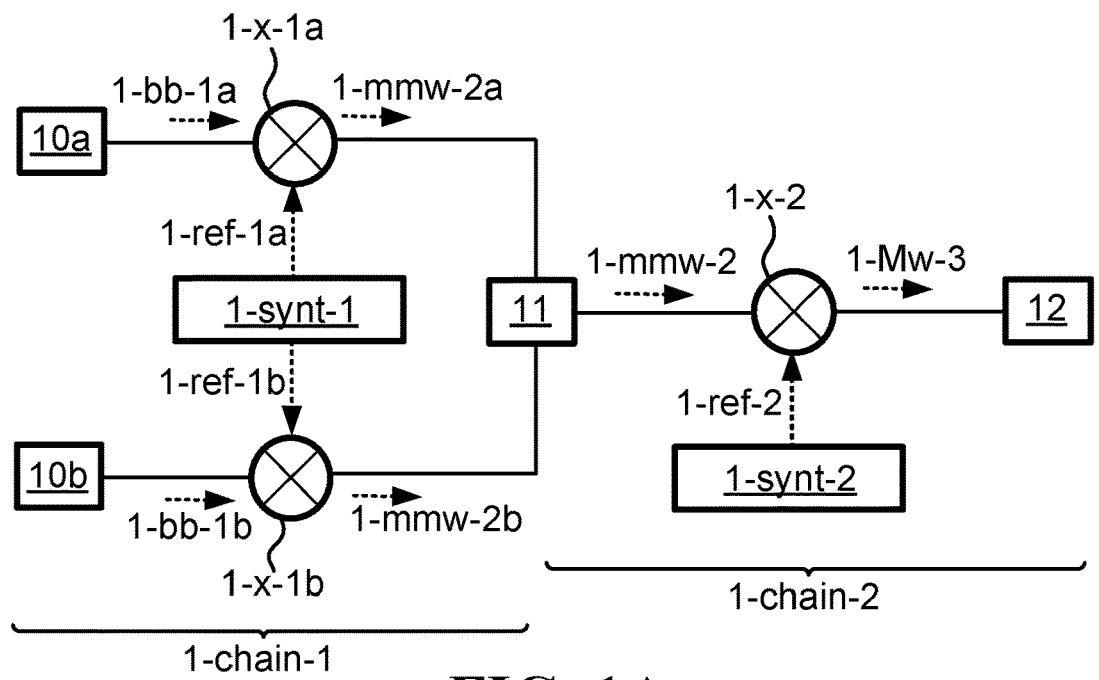
FIG. 1A illustrates one embodiment of a first millimeter-wave chain operative to up-convert signals from a baseband frequency into a millimeter-wave frequency and a second millimeter-wave chain operative to down-convert signals from a millimeter-wave frequency into a microwave frequency.

FIG. 1A illustrates one embodiment of a first millimeter-wave chain 1-chain-1 operative to up-convert signals from a baseband frequency into a millimeter-wave frequency and a second millimeter-wave chain 1-chain-2 operative to down-convert signals from a millimeter-wave frequency into a microwave frequency. A baseband signal 1-bb-1, which may contain I/Q components comprising an in-phase component 1-bb-1a (I) and a quadrature component 1-bb-1b (Q), is up-converted by the first millimeter-wave chain 1-chain-1 to a millimeter-wave frequency, thereby producing a millimeter-wave version 1-mmw-2 (1-mmw-2a, 1-mmw-2b) of the baseband signal 1-bb-1, in which a millimeter-wave frequency is any frequency above 25 GHz (twenty five gigahertz) and below 300 GHz (three hundred gigahertz). The millimeter-wave version 1-mmw-2 of the baseband signal 1-bb-1 is then down-converted by the second millimeter-wave chain 1-chain-2 into a microwave frequency, thereby producing a microwave version 1-Mw-3 of the baseband signal 1-bb-1, in which a microwave frequency is any frequency above 300 MHz (three hundred megahertz) and below 25 GHz (twenty five gigahertz). The actual up-conversion may be achieved using mixers 1-x-1a, 1-x-1b, in which the reference signals to the mixers 1-ref-1a, 1-ref-1b may be produced by a first synthesizer/millimeter-wave oscillator 1-synt-1. The actual down-conversion may be achieved using another mixer 1-x-2, in which the reference signal 1-ref-2 to such a mixer 1-x-2 may be produced by a second synthesizer/millimeter-wave oscillator 1-synt-2. The microwave version 1-Mw-3 of the baseband signal 1-bb-1 may be then transmitted wirelessly via a microwave antenna. Elements 10a, 10b, 11, and 12 represent various radio frequency components such as filters, amplifiers/power amplifiers, power combiners, antennas, or any other component that is usually used in conjunction with radio frequency transmission chains.

Figure 1B:
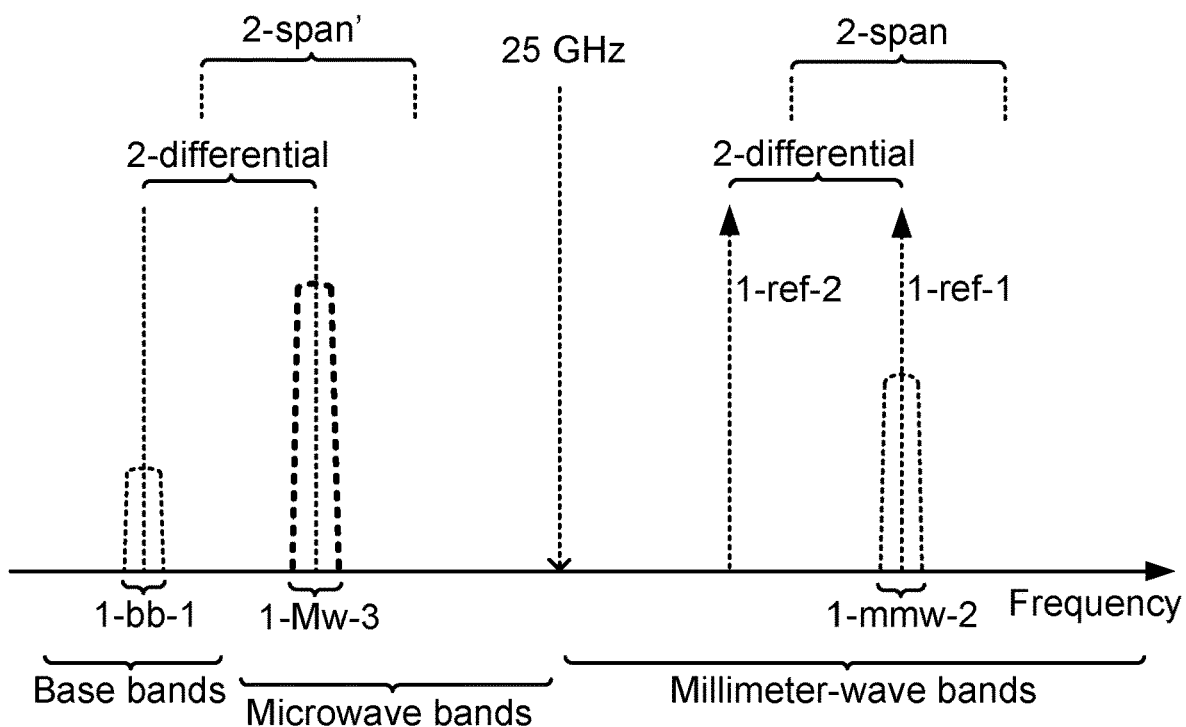
FIG. 1B illustrates one embodiment of a millimeter-wave signal having a certain characteristic frequency that is settable over a certain frequency span and a microwave signal derived from the millimeter-wave signal and thus having a certain characteristic frequency that is settable over a similar frequency span.

FIG. 1B illustrates one embodiment of a millimeter-wave signal 1-mmw-2 having a certain characteristic frequency that is settable over a certain frequency span 2-span and a microwave signal 1-Mw-3 derived from the millimeter-wave signal 1-mmw-2 and thus having a certain characteristic frequency that is settable over a similar frequency span 2-span'. Millimeter-wave signal 1-mmw-2, which is a millimeter-wave version of baseband signal 1-bb-1, is produced by the first millimeter-wave chain 1-chain-1 using reference signals 1-ref-1a, 1-ref-1b (collectively referred to as 1-ref-1) from the local millimeter-wave oscillator 1-synt-1. In one embodiment, millimeter-wave oscillator 1-synt-1 is a programmable oscillator, and therefore the reference signal 1-ref-1 can be set over a certain span of frequencies 2-span. Since millimeter-wave oscillator 1-synt-1 operates in the millimeter-wave frequency range, and since the span of frequencies associated with a programmable oscillator usually increases with operating frequency, then millimeter-wave oscillator 1-synt-1 is expected to have a relatively large frequency span over which reference signal 1-ref-1 can be set. For example, if millimeter-wave oscillator 1-synt-1 operates around a nominal frequency of 60 GHz (sixty gigahertz), then millimeter-wave oscillator 1-synt-1 can be expected to produce a reference signal 1-ref-1 over a span of frequencies 2-span that is at least 5% (five percent) of the nominal frequency, and therefore reference signal 1-ref-1 can be expected to be settable over a span of frequencies 2-span of at least 3 GHz (three gigahertz), e.g., from 58.5 GHz (fifty eight point five gigahertz) to 61.5 (sixty one point five gigahertz). Consequently, the resultant millimeter-wave signal 1-mmw-2 has a characteristic frequency that is settable over the same frequency span 2-span of 3 GHz (three gigahertz). Microwave signal 1-Mw-3, which is a microwave version of baseband signal 1-bb-1, is produced by the second millimeter-wave chain 1-chain-2 using reference signal 1-ref-2 from the local millimeter-wave oscillator 1-synt-2 and using the millimeter-wave signal 1-mmw-2 as an input. Since millimeter-wave signal 1-mmw-2 has a characteristic frequency that is settable over the frequency span 2-span of 3 GHz (three gigahertz) as an example, then consequently, the resultant microwave signal 1-Mw-3 will have a characteristic frequency that is also settable over a similar frequency span 2-span' of 3 GHz (three gigahertz). The characteristic frequency (also referred to as nominal or center frequency) of microwave signal 1-Mw-3 depends on the two reference signals 1-ref-1, 1-ref-2, and more specifically on the difference 2-differential between the frequencies of 1-ref-1 and 1-ref-2. For example, if reference signals 1-ref-1, 1-ref-2 have the frequencies of 61.5 GHz (sixty one point five gigahertz) and 57.9 GHz (fifty seven point nine gigahertz) respectively, then the resultant characteristic frequency of microwave signal 1-Mw-3 will be 3.6 GHz (three point six gigahertz), which happens to be in a microwave band used for 5G cellular communication. Now, according to the example above, since reference signal 1-ref-1 is settable over a span 2-span of 3 GHz (three gigahertz), then the frequency of 1-ref-1 can also be set to 58.5 GHz (fifty eight point five gigahertz), and in that case the resultant characteristic frequency of microwave signal 1-Mw-3 will be 600 MHz (six hundred megahertz), which happens to be in a much lower microwave band used for LTE cellular communication. Similarly, the resultant characteristic frequency of microwave signal 1-Mw-3 can be set, according to this example, to any frequency between 600 MHz (six hundred megahertz) and 3.6 GHz (three point six gigahertz), which practically covers the entire span 2-span' of all frequencies used by cellular radio access networks (RANs). This result is quite unusual, and is made possible due to the translation of the large frequency span 2-span possible with millimeter-wave components 1-synt-1, 1-x-1, 1-synt-2, 1-x-2 into an unusually wide frequency span 2-span' over which a microwave signal 1-Mw-3 can be transmitted. It is noted that in the above example the reference frequency 1-ref-1 changes while the reference frequency 1-ref-2 remains constant, but a similar effect can be achieved by keeping reference frequency 1-ref-1 constant and changing reference frequency 1-ref-2, or by changing both reference frequencies 1-ref-1 and 1-ref-2, as long as the frequency differential 2-differential places the microwave signal 1-Mw-3 in the appropriate microwave band.

Figure 2A:
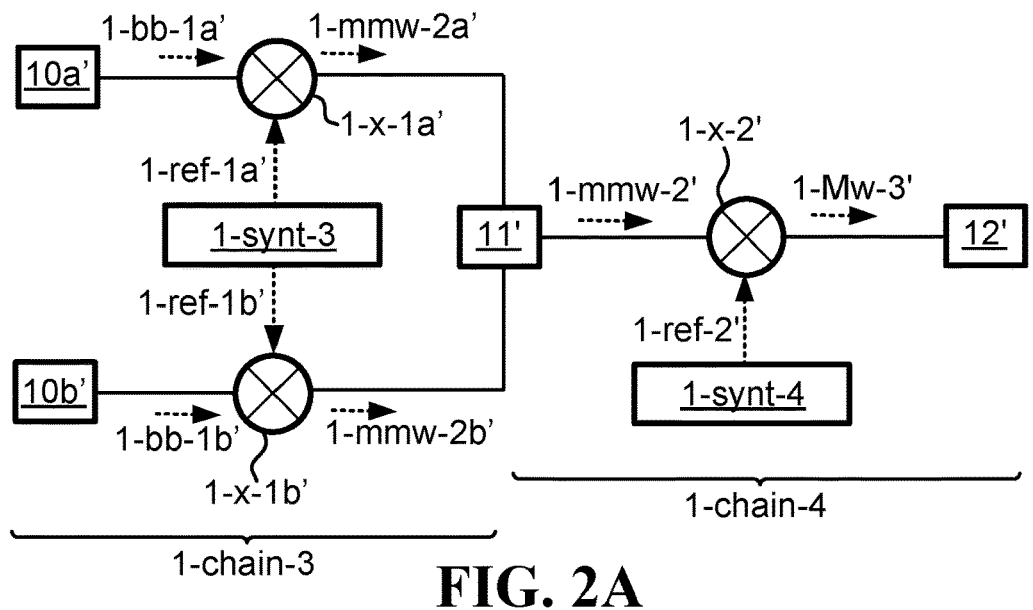
FIG. 2A illustrates one embodiment of a third millimeter-wave chain operative to up-convert signals from a baseband frequency into a millimeter-wave frequency and a fourth millimeter-wave chain operative to down-convert signals from a millimeter-wave frequency into a microwave frequency.

FIG. 2A illustrates one embodiment of a third millimeter-wave chain 1-chain-3 operative to up-convert signals from a baseband frequency into a millimeter-wave frequency and a fourth millimeter-wave chain 1-chain-4 operative to down-convert signals from a millimeter-wave frequency into a microwave frequency. A baseband signal 1-bb-1' (1-bb-1a', 1-bb-1b') is up-converted by the third millimeter-wave chain 1-chain-3 to a millimeter-wave frequency, thereby producing a millimeter-wave version 1-mmw-2' (1-mmw-2a', 1-mmw-2b') of the baseband signal 1-bb-1'. The millimeter-wave version 1-mmw-2' of the baseband signal 1-bb-1' is then down-converted by the fourth millimeter-wave chain 1-chain-4 into a microwave frequency, thereby producing a microwave version 1-Mw-3' of the baseband signal 1-bb-1'. The actual up-conversion may be achieved using mixers 1-x-1a', 1-x-1b', in which the reference signals to the mixers 1-ref-1a', 1-ref-1b' (together 1-ref-1') may be produced by a third synthesizer/millimeter-wave oscillator 1-synt-3. The actual down-conversion may be achieved using another mixer 1-x-2', in which the reference signal 1-ref-2' to such a mixer 1-x-2' may be produced by a fourth synthesizer/millimeter-wave oscillator 1-synt-4. The microwave version 1-Mw-3' of the baseband signal 1-bb-1' may be then transmitted wirelessly via a microwave antenna. Elements 10a', 10b', 11', and 12' represent various radio frequency components such as filters, amplifiers/power amplifiers, power combiners, antennas, or any other component that is usually used in conjunction with radio frequency transmission chains.

Figure 2B:
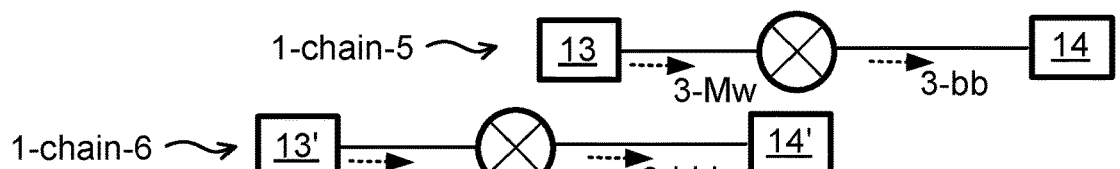
FIG. 2B illustrates one embodiment of a fifth radio-frequency (RF) chain operative to receive a first microwave signal and a sixth RF chain operative to receive a second microwave signal.

FIG. 2B illustrates one embodiment of a fifth radio-frequency (RF) chain 1-chain-5 operative to receive a first microwave signal 3-Mw and a sixth RF chain 1-chain-6 operative to receive a second microwave signal 3-Mw'. The fifth RF chain 1-chain-5 down-converts the first microwave signal 3-Mw into a corresponding baseband signal 3-bb, and The sixth RF chain 1-chain-6 down-converts the second microwave signal 3-Mw' into a corresponding baseband signal 3-bb'. Elements 13, 13', 14, and 14' represent various radio frequency components such as low-noise amplifiers (LNAs) and other amplifiers, filters, antennas, or any other component that is usually used in conjunction with radio frequency reception chains.

Figure 2C:
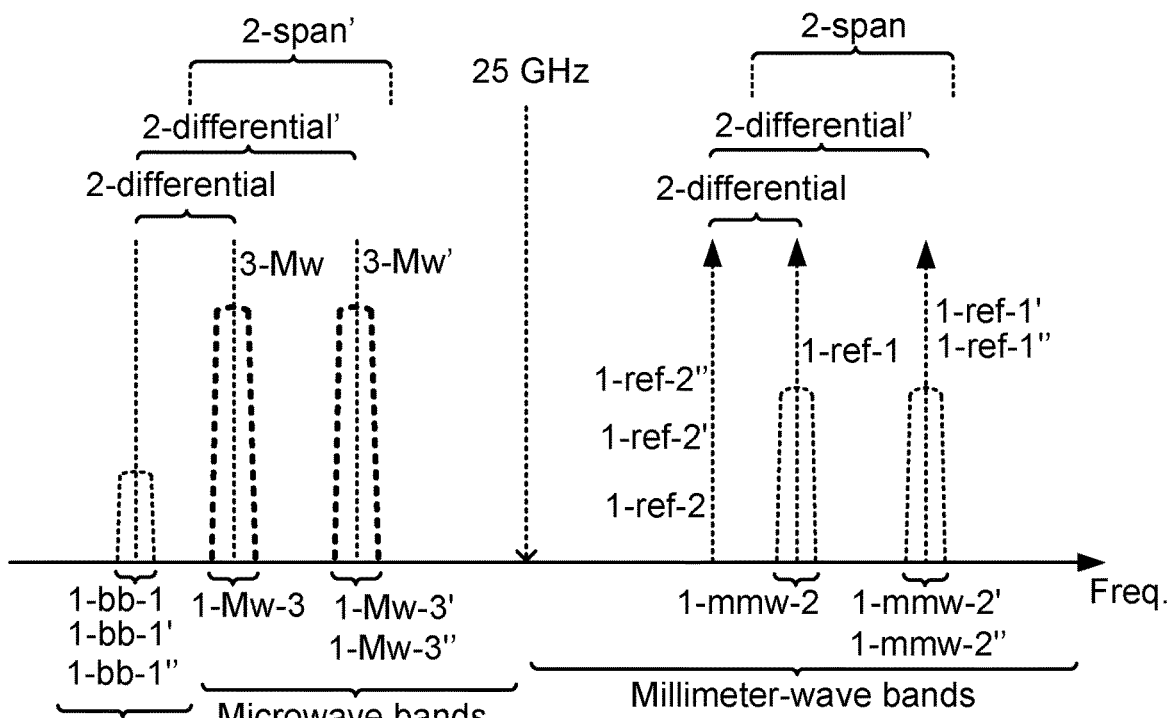
FIG. 2C illustrates one embodiment of two millimeter-wave signals having two different characteristic frequencies that are settable over a certain frequency span and two microwave signals derived respectively from the two millimeter-wave signal and thus having two respective characteristic frequencies that are settable over a similar frequency span.

FIG. 2C illustrates one embodiment of the two millimeter-wave signals 1-mmw-2, 1-mmw-2' having two different characteristic frequencies that are settable over a certain frequency span 2-span and the two microwave signals 1-Mw-3, 1-Mw-3' derived respectively from the two millimeter-wave signals 1-mmw-2, 1-mmw-2' and thus having two respective characteristic frequencies that are settable over a similar frequency span 2-span'. For example, if both millimeter-wave oscillators 1-synt-1 and 1-synt-3 operate around the same nominal frequency of 60 GHz (sixty gigahertz), then millimeter-wave oscillators 1-synt-1, 1-synth-3 can be expected to produce reference signals 1-ref-1, 1-ref-1' over a span of frequencies 2-span that is at least 3 GHz (three gigahertz), e.g., from 58.5 GHz (fifty eight point five gigahertz) to 61.5 (sixty one point five gigahertz). Consequently, the resultant millimeter-wave signals 1-mmw-2, 1-mmw-2' have characteristic frequencies that are settable over the same frequency span 2-span of 3 GHz (three gigahertz). Microwave signals 1-Mw-3, 1-Mw-3', which are microwave versions of baseband signals 1-bb-1, 1-bb-1' respectively, are produces by the second and fourth millimeter-wave chains 1-chain-2, 1-chain-4 respectively using the reference signals 1-ref-2, 1-ref-2' from the local millimeter-wave oscillators 1-synt-2, 1-synt-4 respectively and using the millimeter-wave signals 1-mmw-2, 1-mmw-2' as inputs respectively. Since both millimeter-wave signals 1-mmw-2 and 1-mmw-2' have characteristic frequencies that are settable over the frequency span 2-span of 3 GHz (three gigahertz) as an example, then consequently, the resultant microwave signals 1-Mw-3, 1-Mw-3' will have characteristic frequencies that are also settable over a similar frequency span 2-span' of 3 GHz (three gigahertz). If, as an example, reference signals 1-ref-1', 1-ref-2' have the frequencies of 61.5 GHz (sixty one point five gigahertz) and 57.9 GHz (fifty seven point nine gigahertz) respectively, then the resultant characteristic frequency of microwave signal 1-Mw-3' will be 3.6 GHz (three point six gigahertz), which is equal the difference 2-differential' between these frequencies. If, as an example, reference signals 1-ref-1, 1-ref-2 have the frequencies of 58.5 GHz (fifty eight point five gigahertz) and 57.9 GHz (fifty seven point nine gigahertz) respectively, then the resultant characteristic frequency of microwave signal 1-Mw-3 will be 600 MHz (six hundred megahertz), which is equal to the difference 2-differential between these frequencies. In the above example, both of the signals 1-Mw-3' at 3.6 GHz and 1-Mw-3 at 600 MHz may exist concurrently, thereby facilitating parallel wireless/cellular transmissions at both a first 600 MHz band and a second 3.6 GHz band, or at any other two different bands located inside the span of frequencies 2-span'. According to one example, the reception path of the first 600 MHz band may be facilitated by the RF chain 1-chain-5, which may also operate in the first 600 MHz band, and the reception path of the second 3.6 GHz band may be facilitated by the RF chain 1-chain-6, which may also operate in the second 3.6 GHz band. Now, if all of the RF chains 1-chain-1, 1-chain-2, 1-chain-3, 1-chain-4, 1-chain-5, 1-chain-6 are co-located, perhaps in a single base-station or in a single radio frequency integrated circuit (RFIC), then it could be expected that impairments such as an unwanted non-linearity and other parasitic effects associated with synthesizing the microwave signal 1-Mw-3 at (for example) 600 MHz would create unwanted harmonics at (for example) 3.6 GHz, and therefore interfere with the reception path 1-chain-6 in the second 3.6 GHz band, but this is avoided altogether by synthesizing the microwave signal 1-Mw-3 using millimeter-wave components 1-synt-1, 1-synt-2, 1-x-1, 1-x-2 and millimeter-wave frequencies.

Figure 2D:
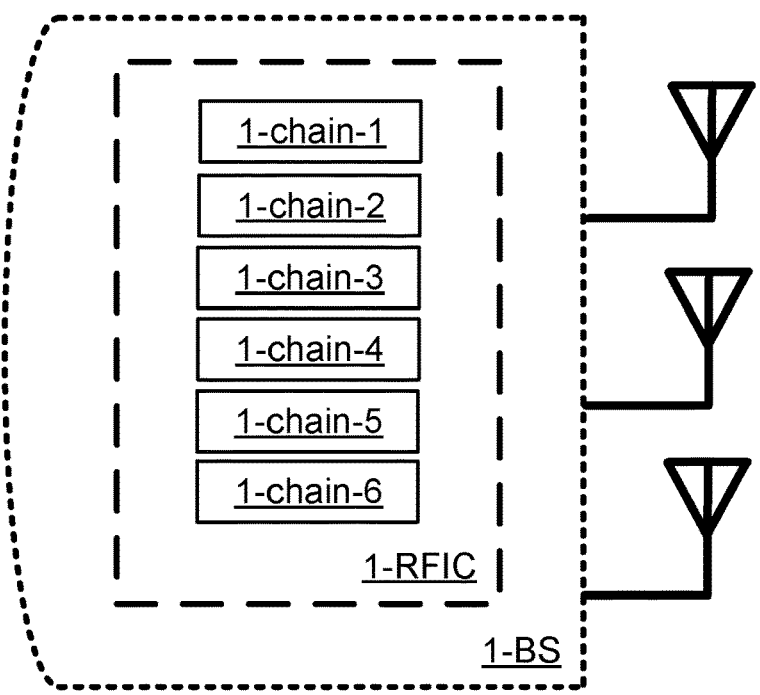
FIG. 2D illustrates one embodiment of a radio frequency integrated circuit (RFIC) containing all of the RF chains and belonging to a wireless base-station or an access point.

FIG. 2D illustrates one embodiment of a radio frequency integrated circuit 1-RFIC containing all of the RF chains 1-chain-1, 1-chain-2, 1-chain-3, 1-chain-4, 1-chain-5, 1-chain-6 and belonging to a wireless base-station, a remote radio head (RRH), or an access point 1-BS. Interferences between different microwave bands/channels are fundamentally avoided as a direct result of synthesizing the microwave signals 1-Mw-3, 1-Mw-3' using millimeter-wave components 1-synt-1, 1-synt-2, 1-x-1, 1-x-2, 1-synt-3, 1-synt-4, 1-x-1', 1-x-2' and employing millimeter-wave frequencies 1-ref-1, 1-ref-2, 1-ref-1', 1-ref-2' that are way above the frequencies of the microwave bands/channels.

One embodiment is a system operative to use millimeter-wave radio components to generate microwave signals over a wide frequency range. The system includes: a first millimeter-wave chain 1-chain-1 operative to up-convert signals from a baseband frequency into a millimeter-wave frequency; a second millimeter-wave chain 1-chain-2 operative to down-convert signals from a millimeter-wave frequency into a microwave frequency; and at least a first programmable millimeter-wave oscillator 1-synt-1 having an oscillation frequency 1-ref-1a, 1-ref-1b, 1-ref-1 that is above 25 GHz (twenty five gigahertz) and that is settable over a span 2-span of at least 1 GHz (one gigahertz).

In one embodiment, the system is configured to: use the at least first programmable millimeter-wave oscillator 1-synt-1 to set a specific exact frequency differential 2-differential between an up-conversion frequency 1-ref-1a, 1-ref-1b, 1-ref-1 associated with the first millimeter-wave chain 1-chain-1 and a down-conversion frequency 1-ref-2 associated with the second millimeter-wave chain 1-chain-2, in which said specific exact frequency differential 2-differential is therefore settable over a span 2-span of at least 1 GHz (one gigahertz); receive a first signal 1-bb-1a, 1-bb-1b, 1-bb-1 in a baseband frequency; use the first millimeter-wave chain 1-chain-1, in conjunction with said up-conversion frequency 1-ref-1a, 1-ref-1b, 1-ref-1, to up-convert the first signal 1-bb-1a, 1-bb-1b, 1-bb-1 from said baseband frequency into a millimeter-wave frequency, thereby producing a millimeter-wave version 1-mmw-2 of the first signal 1-bb-1a, 1-bb-1b, 1-bb-1; and use the second millimeter-wave chain 1-chain-2, in conjunction with said down-conversion frequency 1-ref-2, to down-convert the millimeter-wave version 1-mmw-2 of the first signal into a microwave version 1-Mw-3 of the first signal having a characteristic frequency that is therefore settable over a span 2-span' of at least 1 GHz (one gigahertz).

In one embodiment, the first programmable millimeter-wave oscillator 1-synt-1 has an oscillation frequency that is settable over a frequency span 2-span of at least 1.1 GHz (one point one gigahertz); the specific exact frequency differential 2-differential between the up-conversion frequency 1-ref-1a, 1-ref-1b, 1-ref-1 and the down-conversion frequency 1-ref-2 is settable over at least the range 2-span of frequencies between 800 MHz (eight hundred megahertz) and 1.9 GHz (one point nine gigahertz); and the characteristic frequency of the microwave version 1-Mw-3 of the first signal is settable over at least the range of frequencies 2-span' between 800 MHz (eight hundred megahertz) and 1.9 GHz (one point nine gigahertz), in which said range of frequencies constitutes at least 57.8% (fifty seven point eight percent) of the characteristic frequency, and in which such a high range of frequencies is possible as a direct result of using the first millimeter-wave chain 1-chain-1 operative to up-convert signals from a baseband frequency into a millimeter-wave frequency and the second millimeter-wave chain 1-chain-2 operative to down-convert signals from a millimeter-wave frequency into a microwave frequency.

In one embodiment, the first programmable millimeter-wave oscillator 1-synt-1 has an oscillation frequency that is settable over a frequency span 2-span of at least 2.9 GHz (two point nine gigahertz); the specific exact frequency differential 2-differential between the up-conversion frequency 1-ref-1a, 1-ref-1b, 1-ref-1 and the down-conversion frequency 1-ref-2 is settable over at least the range of frequencies 2-span between 800 MHz (eight hundred megahertz) and 3.7 GHz (three point seven gigahertz); and the characteristic frequency of the microwave version 1-Mw-3 of the first signal is settable over at least the range of frequencies 2-span' between 800 MHz (eight hundred megahertz) and 3.7 GHz (three point seven gigahertz), in which said range of frequencies constitutes at least 78.3% (seventy eight point three percent) of the characteristic frequency, and in which such a very high range of frequencies is possible as a direct result of using the first millimeter-wave chain 1-chain-1 operative to up-convert signals from a baseband frequency into a millimeter-wave frequency and the second millimeter-wave chain 1-chain-2 operative to down-convert signals from a millimeter-wave frequency into a microwave frequency.

In one embodiment, the first programmable millimeter-wave oscillator 1-synt-1 has an oscillation frequency that is settable over a frequency span 2-span of at least 1.4 GHz (one point four gigahertz); the specific exact frequency differential 2-differential between the up-conversion frequency 1-ref-1a, 1-ref-1b, 1-ref-1 and the down-conversion frequency 1-ref-2 is settable over at least the range of frequencies 2-span between 2.3 GHz (two point three gigahertz) and 3.7 GHz (three point seven gigahertz); and the characteristic frequency of the microwave version 1-Mw-3 of the first signal is settable over at least the range of frequencies 2-span' between 2.3 GHz (two point three gigahertz) and 3.7 GHz (three point seven gigahertz), in which said range of frequencies constitutes at least 37.8% (thirty seven point eight percent) of the characteristic frequency, and in which such a high range of frequencies is possible as a direct result of using the first millimeter-wave chain 1-chain-1 operative to up-convert signals from a baseband frequency into a millimeter-wave frequency and the second millimeter-wave chain 1-chain-2 operative to down-convert signals from a millimeter-wave frequency into a microwave frequency.

In one embodiment, the first programmable millimeter-wave oscillator 1-synt-1 has an oscillation frequency that is settable over a frequency span 2-span of at least 5 GHz (five gigahertz); the specific exact frequency differential 2-differential between the up-conversion frequency 1-ref-1a, 1-ref-1b, 1-ref-1 and the down-conversion frequency 1-ref-2 is settable over at least the range of frequencies 2-span between 800 MHz (eight hundred megahertz) and 5.8 GHz (five point eight gigahertz); and the characteristic frequency of the microwave version 1-Mw-3 of the first signal is settable over at least the range of frequencies 2-span' between 800 MHz (eight hundred megahertz) and 5.8 GHz (five point eight gigahertz), in which said range of frequencies constitutes at least 86.2% (eighty six point two percent) of the characteristic frequency, and in which such an ultra high range of frequencies is possible as a direct result of using the first millimeter-wave chain 1-chain-1 operative to up-convert signals from a baseband frequency into a millimeter-wave frequency and the second millimeter-wave chain 1-chain-2 operative to down-convert signals from a millimeter-wave frequency into a microwave frequency.

In one embodiment, the system further includes: a third millimeter-wave chain 1-chain-3 operative to up-convert signals from a baseband frequency into a millimeter-wave frequency; a fourth millimeter-wave chain 1-chain-4 operative to down-convert signals from a millimeter-wave frequency into a microwave frequency; and at least one other programmable millimeter-wave oscillator 1-synt-3 having an oscillation frequency 1-ref-1a', 1-ref-1b', 1-ref-1' that is above 25 GHz (twenty five gigahertz) and that is settable over a frequency span 2-span of at least 1 GHz (one gigahertz). In one embodiment the system is further configured to: use the at least one other programmable millimeter-wave oscillator 1-synt-3 to set another specific exact frequency differential 2-differential' between another up-conversion frequency 1-ref-1a', 1-ref-1b', 1-ref-1' associated with the third millimeter-wave chain 1-chain-3 and another down-conversion frequency 1-ref-2' associated with the fourth millimeter-wave chain 1-chain-4, in which said another specific exact frequency differential 2-differential' is therefore settable over a span 2-span of at least 1 GHz (one gigahertz); receive a second signal 1-bb-1a', 1-bb-1b', 1-bb-1' in a baseband frequency; use the third millimeter-wave chain 1-chain-3, in conjunction with said another up-conversion frequency 1-ref-1a', 1-ref-1b', 1-ref-1', to up-convert the second signal 1-bb-1a', 1-bb-1b', 1-bb-1' from said baseband frequency into a millimeter-wave frequency, thereby producing a millimeter-wave version 1-mmw-2' of the second signal 1-bb-1a', 1-bb-1b', 1-bb-1'; and use the fourth millimeter-wave chain 1-chain-4, in conjunction with said another down-conversion frequency 1-ref-2', to down-convert the millimeter-wave version 1-mmw-2' of the second signal into a microwave version 1-Mw-3' of the second signal having a characteristic frequency that is therefore settable over a span 2-span' of at least 1 GHz (one gigahertz). In one embodiment, the system further includes: a first circuitry 1-chain-5 operative to receive a first incoming signal 3-Mw having a characteristic frequency associated with the characteristic frequency of the microwave versions 1-Mw-3 of the first signal, and a second circuitry 1-chain-6 operative to receive a second incoming signal 3-Mw' having a characteristic frequency associated with the characteristic frequency of the microwave versions 1-Mw-3' of the second signal; the microwave version of the second signal 1-Mw-3' has a higher characteristic frequency than the microwave version of the first signal 1-Mw-3; and the first programmable millimeter-wave oscillator 1-synt-1 does not interfere with said reception of the second incoming signal 3-Mw' as a direct result of the first programmable millimeter-wave oscillator 1-synt-1 having an oscillation frequency 1-ref-1*a*, 1-ref-1*b*, 1-ref-1 that is above 25 GHz (twenty five gigahertz) and that is therefore way above the characteristic frequency of the second incoming signal 3-Mw'. In one embodiment, the microwave version 1-Mw-3 of the first signal and the first incoming signal 3-Mw are both associated with a first wireless communication channel, in which the microwave version 1-Mw-3 of the first signal is used as a transmission signal in conjunction with said first wireless communication channel; and the microwave version 1-Mw-3' of the second signal and the second incoming signal 3-Mw' are both associated with a second wireless communication channel, in which the microwave version of the second signal 1-Mw-3' is used as a transmission signal in conjunction with said second wireless communication channel, and in which the second wireless communication channel is associated with a frequency that is higher than the frequency associated with the first wireless communication channel.

In one embodiment, the first wireless communication channel is associated with frequencies selected from a group consisting of: (i) frequencies in the 500 MHz (five hundred megahertz) band (i.e., frequencies between 500 MHz and 600 MHz), (ii) frequencies in the 600 MHz (six hundred megahertz) band, (iii) frequencies in the 700 MHz (seven hundred megahertz) band, (iv) frequencies in the 800 MHz (eight hundred megahertz) band, and (v) frequencies in the 900 MHz (nine hundred megahertz) band; and the second wireless communication channel is associated with frequencies selected from a group consisting of: (i) frequencies in the 1.7 GHz (one point seven gigahertz) band, (ii) frequencies in the 1.8 GHz (one point eight gigahertz) band, (iii) frequencies in the 1.9 GHz (one point nine gigahertz) band, (iv) frequencies in the 2.1 GHz (two point one gigahertz) band, (v) frequencies in the 2.3 GHz (two point three gigahertz) band, (vi) frequencies in the 2.4 GHz (two point four gigahertz) band, (vii) frequencies in the 2.5 GHz (two point five gigahertz) band, and (viii) frequencies in the 3.6 GHz (three point six gigahertz) band; wherein the second wireless communication channel successfully coexists with the first wireless communication channel as a direct result of the first programmable millimeter-wave oscillator 1-synth-1 having an oscillation frequency 1-ref-1*a*, 1-ref-1*b*, 1-ref-1 that is above 25 GHz (twenty five gigahertz) and that is therefore way above the frequencies of the second incoming signal 3-Mw' of the second wireless communication channel.

In one embodiment, the first wireless communication channel is associated with frequencies in the 2.4 GHz (two point four gigahertz) band (i.e., frequencies between 2.4 GHz and 2.5 GHz); and the second wireless communication channel is associated with frequencies in the 5 GHz (five gigahertz) band (i.e., frequencies between 5 GHz and 5.8 GHz); wherein the second wireless communication channel successfully coexists with the first wireless communication channel as a direct result of the first programmable millimeter-wave oscillator 1-synth-1 having an oscillation frequency 1-ref-1*a*, 1-ref-1*b*, 1-ref-1 that is above 25 GHz (twenty five gigahertz) and that is therefore way above the frequencies of the second incoming signal 3-Mw' of the second wireless communication channel.

In one embodiment, at least most parts of the millimeter-wave chains 1-chain-1, 1-chain-2, 1-chain-3, 1-chain-4 and the programmable millimeter-wave oscillators 1-synt-1, 1-synt-3 are implemented on a single radio frequency integrated circuit (RFIC) 1-RFIC.

In one embodiment, the first and second wireless communication channels are associated with a radio access network (RAN) component 1-BS such as a cellular base station or a wireless access point such as a WiFi access point.

In one embodiment, the at least first programmable millimeter-wave oscillator 1-synt-1 comprises: (i) the first programmable millimeter-wave oscillator 1-synt-1 and (ii) a second programmable millimeter-wave oscillator 1-synt-2, in which the up-conversion frequency 1-ref-1*a*, 1-ref-1*b*, 1-ref-1 is generated by the first programmable millimeter-wave oscillator 1-synt-1 and the down-conversion frequency 1-ref-2 is generated by the second programmable millimeter-wave oscillator 1-synt-2, thereby facilitating said setting of the exact frequency differential 2-differential.

Figure 3:
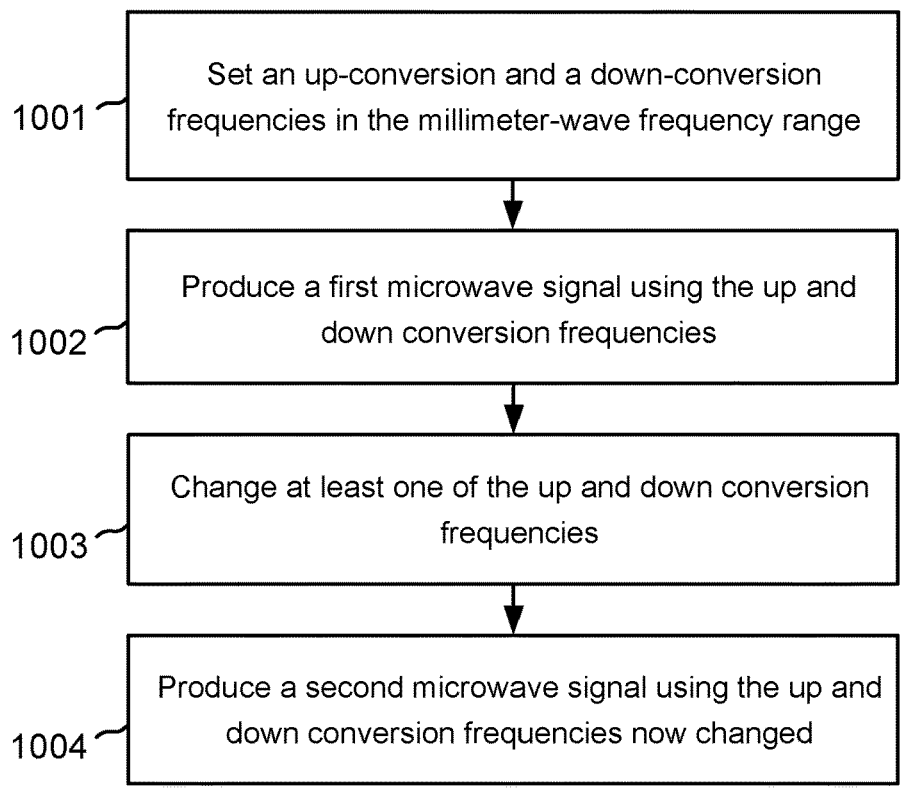
FIG. 3 illustrates one embodiment of a method for using millimeter-wave radio components for generating microwave signals over a wide frequency range.

FIG. 3 illustrates one embodiment of a method for using millimeter-wave radio components for generating microwave signals over a wide frequency range. The method includes: In step 1001, setting a specific first up-conversion frequency 1-ref-1 and a specific first down-conversion frequency 1-ref-2 using at least a first programmable millimeter-wave oscillator 1-synt-1 having an oscillation frequency 1-ref-1 that is above 25 GHz (twenty five gigahertz) and that is settable over a span 2-span of at least 1 GHz (one gigahertz). In step 1002, up-converting a first signal 1-bb-1 from a baseband frequency into a millimeter-wave frequency using the specific first up-conversion frequency 1-ref-1, thereby producing a millimeter-wave version 1-mmw-2 of the first signal 1-bb-1, and then down-converting the millimeter-wave version 1-mmw-2 of the first signal using the specific first down-conversion frequency 1-ref-2, thereby producing a microwave version 1-Mw-3 of the first signal characterized by a particular first frequency that is equal to the difference 2-differential between said specific first up-conversion frequency 1-ref-1 and said specific first down-conversion frequency 1-ref-2. In step 1003, setting at least one of: (i) a specific second up-conversion frequency 1-ref-1" (FIG. 2C) and (ii) a specific second down-conversion frequency 1-ref-2" (FIG. 2C) using at least the first programmable millimeter-wave oscillator 1-synt-1. In step 1004, up-converting a second signal 1-bb-1" (FIG. 2C) from the baseband frequency into a millimeter-wave frequency using the specific second up-conversion frequency 1-ref-1", thereby producing a millimeter-wave version 1-mmw-2" (FIG. 2C) of the second signal 1-bb-1", and then down-converting the millimeter-wave version 1-mmw-2" of the second signal using the specific second down-conversion frequency 1-ref-2", thereby producing a microwave version 1-Mw-3" (FIG. 2C) of the second signal characterized by a particular second frequency that is equal to the difference 2-differential' (FIG. 2C) between said specific second up-conversion frequency 1-ref-1" and said specific second down-conversion frequency 1-ref-2", in which the particular second frequency varies by at least 1 GHz (one gigahertz) from the particular first frequency as a result of said span 2-span, 2-span'.

In one embodiment, the method further comprises: receiving a first request to transmit via a first microwave band, in which said setting of the specific first up-conversion frequency 1-ref-1 and the specific first down-conversion frequency 1-ref-2 is a result of said first request; and transmitting wirelessly the microwave version 1-Mw-3 of the first signal as a further result of said first request. In one embodiment, the method further comprises: receiving a second request to transmit via a second microwave band, in which said setting of the specific second up-conversion frequency 1-ref-1" and the specific second down-conversion frequency 1-ref-2" is a result of said second request; and transmitting wirelessly the microwave version 1-Mw-3" of the second signal as a further result of said second request.

In one embodiment, the first microwave band is associated with frequencies selected from a group consisting of: (i) frequencies in the 500 MHz (five hundred megahertz) band, (ii) frequencies in the 600 MHz (six hundred megahertz) band, (iii) frequencies in the 700 MHz (seven hundred megahertz) band, (iv) frequencies in the 800 MHz (eight hundred megahertz) band, and (v) frequencies in the 900 MHz (nine hundred megahertz) band; and the second microwave band is associated with frequencies selected from a group consisting of: (i) frequencies in the 1.7 GHz (one point seven gigahertz) band, (ii) frequencies in the 1.8 GHz (one point eight gigahertz) band, (iii) frequencies in the 1.9 GHz (one point nine gigahertz) band, (iv) frequencies in the 2.1 GHz (two point one gigahertz) band, (v) frequencies in the 2.3 GHz (two point three gigahertz) band, (vi) frequencies in the 2.4 GHz (two point four gigahertz) band, (vii) frequencies in the 2.5 GHz (two point five gigahertz) band, and (viii) frequencies in the 3.6 GHz (three point six gigahertz) band.

In one embodiment, the first microwave band is associated with frequencies in the 2.4 GHz (two point four gigahertz) band; and the second microwave band is associated with frequencies in the 5 GHz (five gigahertz) band.

In one embodiment, said setting of at least one of: (i) the specific second up-conversion frequency 1-ref-1" and (ii) the specific second down-conversion frequency 1-ref-2" using at least the first programmable millimeter-wave oscillator 1-synt-1 comprises: setting the specific second up-conversion frequency1-ref-1" using the first programmable millimeter-wave oscillator 1-synt-1; in which: the specific second down-conversion frequency 1-ref-2" is equal to the specific first down-conversion frequency 1-ref-2, and therefore the specific second down-conversion frequency 1-ref-2" does not require setting.

In one embodiment, said setting of at least one of: (i) the specific second up-conversion frequency 1-ref-1" and (ii) the specific second down-conversion frequency 1-ref-2" using at least the first programmable millimeter-wave oscillator 1-synt-1 comprises: setting the specific second down-conversion frequency 1-ref-2" using the first programmable millimeter-wave oscillator 1-synt-1; in which: the specific second up-conversion frequency 1-ref-1" is equal to the specific first up-conversion frequency 1-ref-1, and therefore the specific second up-conversion frequency 1-ref-1" does not require setting.

In one embodiment, said setting of at least one of: (i) the specific second up-conversion frequency 1-ref-1" and (ii) the specific second down-conversion frequency 1-ref-2" using at least the first programmable millimeter-wave oscillator 1-synt-1 comprises: setting the specific second up-conversion frequency 1-ref-1" using the first programmable millimeter-wave oscillator 1-synt-1; and setting the specific second down-conversion frequency 1-ref-2" using a second programmable millimeter-wave oscillator 1-synt-2.

Figure 4A:
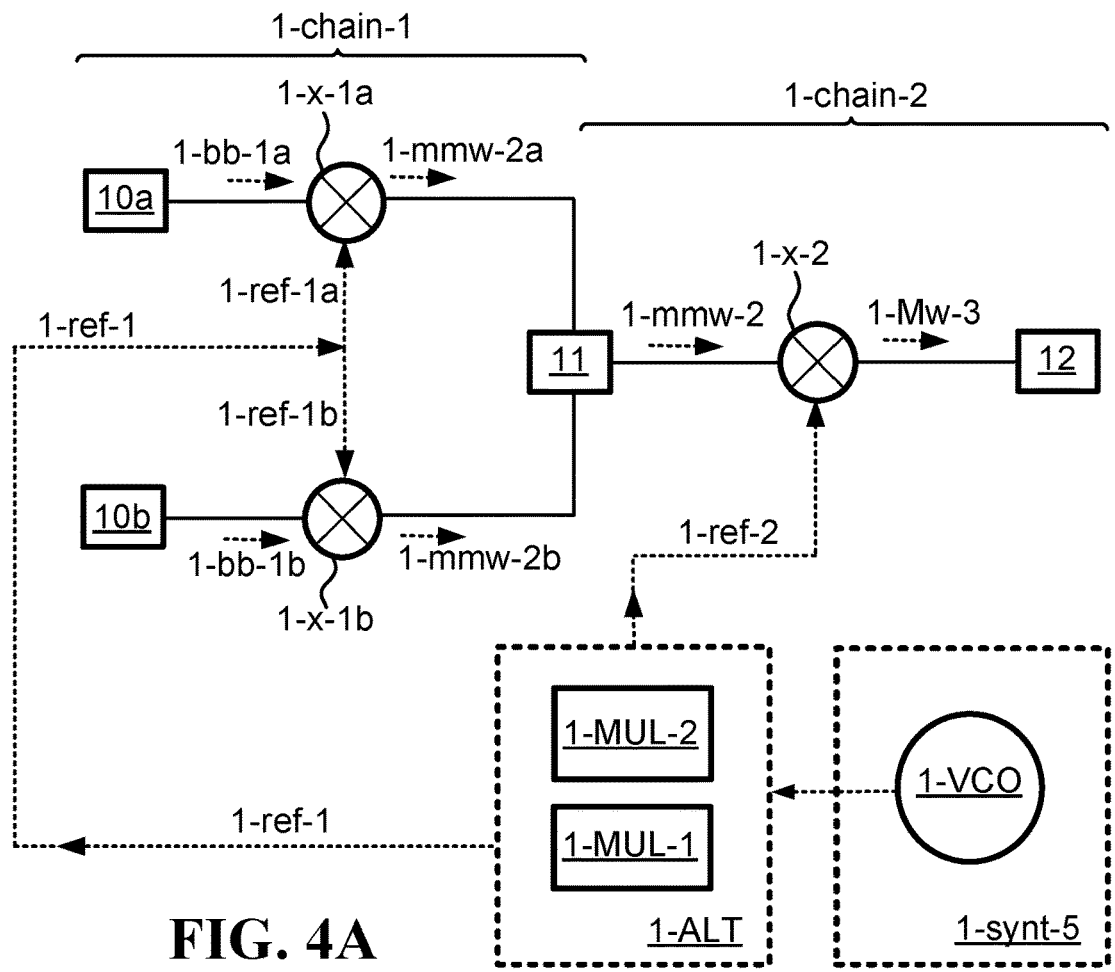
FIG. 4A illustrates one embodiment of a system operative to generate a specific exact frequency differential between a first millimeter-wave frequency and a second millimeter-wave frequency.

FIG. 4A illustrates one embodiment of a system operative to generate a specific exact frequency differential between a first millimeter-wave frequency and a second millimeter-wave frequency.

A baseband and/or intermediate signal 1-bb-1, which may contain I/Q components comprising an in-phase component 1-bb-1a (I) and a quadrature component 1-bb-1b (Q), is up-converted by the first millimeter-wave chain 1-chain-1 to a millimeter-wave frequency, thereby producing a millimeter-wave version 1-mmw-2 (1-mmw-2a, 1-mmw-2b) of the signal 1-bb-1, in which a millimeter-wave frequency in the context of the system depicted in FIG. 4A is any frequency above 18 GHz (eighteen gigahertz) and below 300 GHz (three hundred gigahertz). The millimeter-wave version 1-mmw-2 of the signal 1-bb-1 is then down-converted by the second millimeter-wave chain 1-chain-2 into a microwave frequency, thereby producing a microwave version 1-Mw-3 of the signal 1-bb-1, in which a microwave frequency in the context of the system depicted in FIG. 4A is any frequency above 300 MHz (three hundred megahertz) and below 18 GHz (eighteen gigahertz). The actual up-conversion may be achieved using mixers 1-x-1a, 1-x-1b, in which the reference signals to the mixers 1-ref-1a, 1-ref-1b are produced (e.g., using a first frequency multiplier 1-MUL-1) from a synthesizer 1-synt-5 comprising a single microwave frequency source 1-VCO. The actual down-conversion may be achieved using another mixer 1-x-2, in which the reference signal 1-ref-2 to such a mixer 1-x-2 is produced (e.g., using a second frequency multiplier 1-MUL-2) from the synthesizer associated with the same single microwave frequency source 1-VCO. The microwave version 1-Mw-3 of the signal 1-bb-1 may be then transmitted wirelessly via a microwave antenna. Elements 10a, 10b, 11, and 12 represent various radio frequency components such as filters, amplifiers/power amplifiers, power combiners, antennas, or any other component that is usually used in conjunction with radio frequency transmission chains. It is noted that the two millimeter-wave reference frequencies 1-ref-1, 1-ref-2 are produced from a single lower frequency source 1-VCO. The mechanism (e.g., 1-MUL-1, 1-MUL-2) associated with generating the millimeter-wave references 1-ref-1, 1-ref-2 can also be referred to as a frequency alteration mechanism 1-ALT, which may comprise any combination of frequency multipliers, frequency dividers, counters, PLLs, synthesizers, comparators, logical circuitry, non-linear circuitry, transistors, diodes, or any other elements that when put together are able to generate a higher millimeter-wave reference frequencies 1-ref-1, 1-ref-2 from the single lower frequency source 1-VCO. Frequency multiplication may be achieved, as a non limiting example, using a diode clipping mechanism acting as a frequency doubler, or acting as an odd-harmonics multiplier, or it may be achieved using a class C amplifier having a switching nature that creates higher harmonics of an input signal, or it may be achieved using a step recovery diode (SRD). Frequency multiplication may also be achieved using a mixer in which the radio frequency input is also acting as the local input, thus generating a double frequency component at the output. It is also noted that any given millimeter-wave reference frequency 1-ref-1, 1-ref-2 can be generated using a combination of frequency dividers and frequency multipliers connected in series.

Figure 4B:
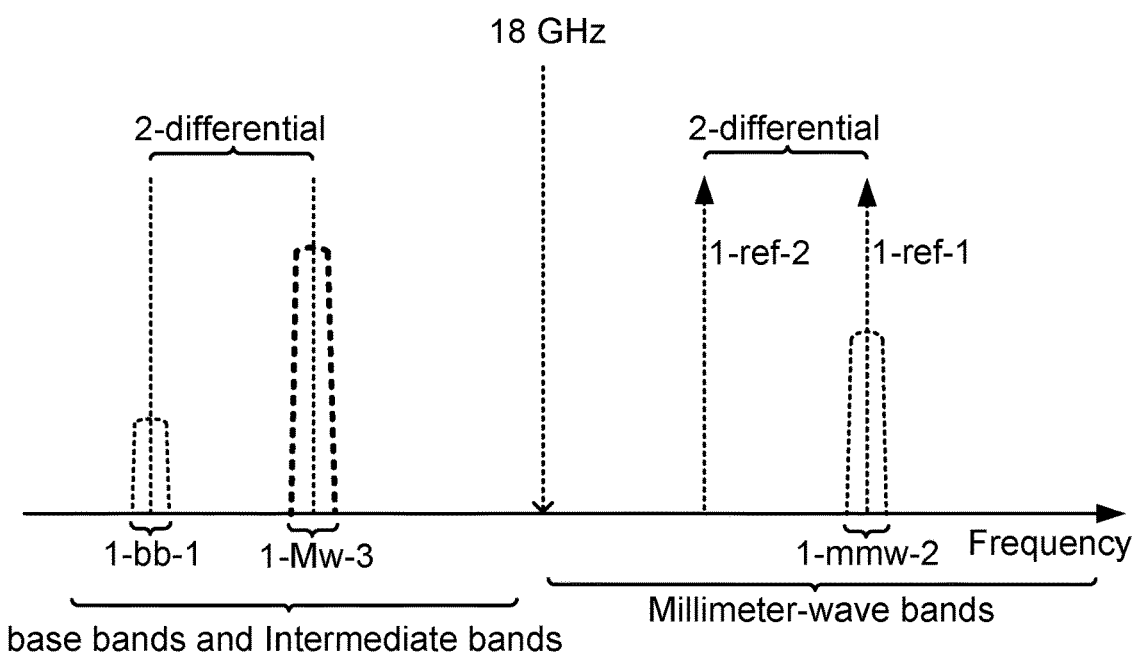
FIG. 4B illustrates one embodiment of the specific exact frequency differential between a first millimeter-wave frequency and a second millimeter-wave frequency.

FIG. 4B illustrates one embodiment of the specific exact frequency differential between a first millimeter-wave frequency and a second millimeter-wave frequency.

Millimeter-wave signal 1-mmw-2, which is a millimeter-wave version of baseband and/or intermediate signal 1-bb-1, is generated by the first millimeter-wave chain 1-chain-1 using millimeter-wave reference signals 1-ref-1a, 1-ref-1b (collectively referred to as 1-ref-1) produced 1-MUL-1 from the single lower frequency source 1-VCO. Microwave signal 1-Mw-3, which is a microwave version of baseband and/or intermediate signal 1-bb-1, is generated by the second millimeter-wave chain 1-chain-2 using a millimeter-wave reference signal 1-ref-2 produced 1-MUL-2 from the same single lower frequency source 1-VCO. The characteristic frequency (also referred to as nominal or center frequency) of microwave signal 1-Mw-3 depends on the two millimeter-wave reference signals 1-ref-1, 1-ref-2, and more specifically on the difference 2-differential between the frequencies of 1-ref-1 and 1-ref-2. For example, if reference signals 1-ref-1, 1-ref-2 have the frequencies of 61.5 GHz (sixty one point five gigahertz) and 57.9 GHz (fifty seven point nine gigahertz) respectively, then the resultant characteristic frequency of microwave signal 1-Mw-3 will be 3.6 GHz (three point six gigahertz), which happens to be in a microwave band used for 5G cellular communication.

The single frequency source 1-VCO has a phase noise associated with microwave sources. However, each of the two millimeter-wave references 1-ref-1, 1-ref-2 is associated with a higher phase noise, e.g., as a result of being derived from the single frequency source 1-VCO using frequency multiplication techniques 1-MUL1, 1-MUL-2. The higher phase noise could have been detrimental in generating the microwave signal 1-Mw-3, perhaps since the microwave signal carries QAM symbols that are sensitive to phase noise, however, the frequency difference 2-differential between the millimeter-wave frequencies of 1-ref-1 and 1-ref-2 can be made to "cancel" the higher phase noise, as a result of the two millimeter-wave frequencies of 1-ref-1, 1-ref-2 being produced from a single source 1-VCO, and in that case the resulting microwave signal 1-Mw-3 can be made free of the extra phase noise introduced by the frequency multiplication techniques 1-MUL1, 1-MUL-2.

One embodiment is a system operative to generate a specific exact frequency differential between a first millimeter-wave frequency and a second millimeter-wave frequency, comprising: a single oscillator 1-VCO (FIG. 4A); and a frequency alteration mechanism 1-ALT (FIG. 4A) comprising at least a first frequency multiplier 1-MUL-1.

In one embodiment, the system is configured to use the single oscillator 1-VCO in conjunction with the frequency alteration mechanism 1-ALT to generate a first millimeter-wave frequency 1-ref-1 (FIG. 4A, FIG. 4B) that is above 18 GHz (eighteen gigahertz); the system is further configured to use the single oscillator 1-VCO, again, in conjunction with the frequency alteration mechanism 1-ALT to generate a second millimeter-wave frequency 1-ref-2 (FIG. 4A, FIG. 4B) that is below the first millimeter-wave frequency 1-ref-1 but still above 18 GHz, so as to create a specific exact frequency differential 2-differential (FIG. 4B) between the first millimeter-wave frequency 1-ref-1 and a second millimeter-wave frequency 1-ref-2, in which the first millimeter-wave frequency and a second millimeter-wave frequency 1-ref-1, 1-ref-2 are at least partially phase-correlated as a result of being generated from the single oscillator 1-VCO; and both said first millimeter-wave frequency 1-ref-1 and second millimeter-wave frequency 1-ref-2 are associated with a millimeter-wave phase noise that is above a certain noise level, however the specific exact frequency differential 2-differential is associated with a phase noise that is below said certain noise level as a direct result of said phase-correlation, and is therefore usable for generating a certain signal 1-Mw-3 (FIG. 4A, FIG. 4B) associated with a certain baseband and/or intermediate frequency.

In one embodiment, the system further comprises: a first millimeter-wave chain 1-chain-1 (FIG. 4A) operative to up-convert signals from a baseband and/or intermediate frequency into a millimeter-wave frequency; and a second millimeter-wave chain 1-chain-2 (FIG. 4A) operative to down-convert signals from a millimeter-wave frequency into a baseband and/or intermediate frequency.

In one embodiment, as a part of said generation of the certain signal 1-Mw-3, the system is configured to: obtain a first signal 1-bb-1 (FIG. 4B) in a first baseband and/or intermediate frequency; use the first millimeter-wave chain 1-chain-1, in conjunction with the first millimeter-wave frequency 1-ref-1 acting as up-conversion frequency, to up-convert the first signal 1-bb-1 from said first baseband and/or intermediate frequency into a millimeter-wave frequency, thereby producing a millimeter-wave version 1-mmw-2 (FIG. 4B) of the first signal 1-bb-1; and use the second millimeter-wave chain 1-chain-2, in conjunction with the second millimeter-wave frequency 1-ref-2 acting as down-conversion frequency, to down-convert the millimeter-wave version 1-mmw-2 of the first signal into the certain signal 1-Mw-3 having a frequency associated with the specific exact frequency differential 2-differential, in which the certain signal 1-Mw-3 is associated with said phase noise that is below said certain noise level.

In one embodiment, the first millimeter-wave frequency 1-ref-1 and a second millimeter-wave frequency 1-ref-2 are fully phase-correlated as a combined result of (i) being generated from the single oscillator 1-VCO and (ii) being phase-matched between said up-conversion and said down-conversion, thereby at least partially canceling phase noise introduced during said up-conversion with phase noise introduced during said down-conversion.

In one embodiment, as part of said phase-matching, the system is further configured to: adjust a phase of the up-conversion frequency 1-ref-1 relative to a phase of the down-conversion frequency 1-ref-2, until reaching a certain desirable phase noise level associated with the certain signal 1-Mw-3.

In one embodiment, said desirable phase noise level is below an integrated phase noise of −45 dBc (minus forty-five decibel-carrier), in which the integrated phase noise is measured/integrated over a bandwidth associated with the certain signal 1-Mw-3.

In one embodiment, both said first millimeter-wave frequency 1-ref-1 and second millimeter-wave frequency 1-ref-2 are associated with an integrated phase noise of above −35 dBc (minus thirty-five decibel-carrier) as measured in conjunction with a bandwidth associated with the certain signal 1-Mw-3; and as a direct result of said phase-correlation, the specific exact frequency differential 2-differential is associated with an integrated phase noise of below −35 dBc as measured in conjunction with a bandwidth associated with the certain signal 1-Mw-3.

In one embodiment, the certain signal 1-Mw-3 and the specific exact frequency differential 2-differential are both associated with a frequency below 7 GHz (seven gigahertz); and the certain signal 1-Mw-3 is associated with said integrated phase noise of below −35 dBc as measured in conjunction with a bandwidth associated with the certain signal 1-Mw-3.

In one embodiment, the certain signal 1-Mw-3 is associated with a QAM256 and/or higher modulation transmission; and the specific exact frequency differential 2-differential and the certain signal 1-Mw-3 are associated with an integrated phase noise of below −45 dBc (minus forty-five decibel-carrier) as measured in conjunction with a bandwidth associated with the certain signal 1-Mw-3.

In one embodiment, both said first millimeter-wave frequency 1-ref-1 and second millimeter-wave frequency 1-ref-2 are associated with an integrated phase noise of above −30 dBc (minus thirty decibel-carrier) as measured in conjunction with a bandwidth associated with the certain signal 1-Mw-3.

In one embodiment, the certain signal 1-Mw-3 is associated with a QAM64 transmission; and the specific exact frequency differential 2-differential is associated with an integrated phase noise of below −40 dBc (minus forty decibel-carrier) as measured in conjunction with a bandwidth associated with the certain signal 1-Mw-3.

In one embodiment, the certain signal 1-Mw-3 is associated with frequencies selected from a group consisting of: (i) frequencies in the 1.7 GHz to 1.9 GHz cellular band, (ii) frequencies in the 2.1 GHz to 2.4 GHz cellular band, (iii) frequencies in the 2.4 GHz ism band, (iv) frequencies in the 2.5 GHz cellular band, (v) frequencies in the 3.6 GHz cellular band, and (vi) frequencies in the 5 GHz to 5.8 GHz ism band.

In one embodiment, the certain signal 1-Mw-3 is associated with a communication standard selected from a group consisting of: (i) LTE, (ii) 5G, and (iii) WiFi.

In one embodiment, the frequency alteration mechanism 1-ALT further comprises a second frequency multiplier 1-MUL-2; as part of said generation of the first millimeter-wave frequency 1-ref-1, the frequency alteration mechanism 1-ALT is configured to use the first frequency multiplier 1-MUL-1 to multiply a frequency associated with the single oscillator 1-VCO; and as part of said generation of the second millimeter-wave frequency 1-ref-2, the frequency alteration mechanism 1-ALT is configured to use the second frequency multiplier 1-MUL-2 to multiply a frequency associated with the same single oscillator 1-VCO, in which as a result of said frequency multiplications, both said first millimeter-wave frequency 1-ref-1 and second millimeter-wave frequency 1-ref-2 are associated with a millimeter-wave phase noise that is above the certain noise level.

Figure 5:
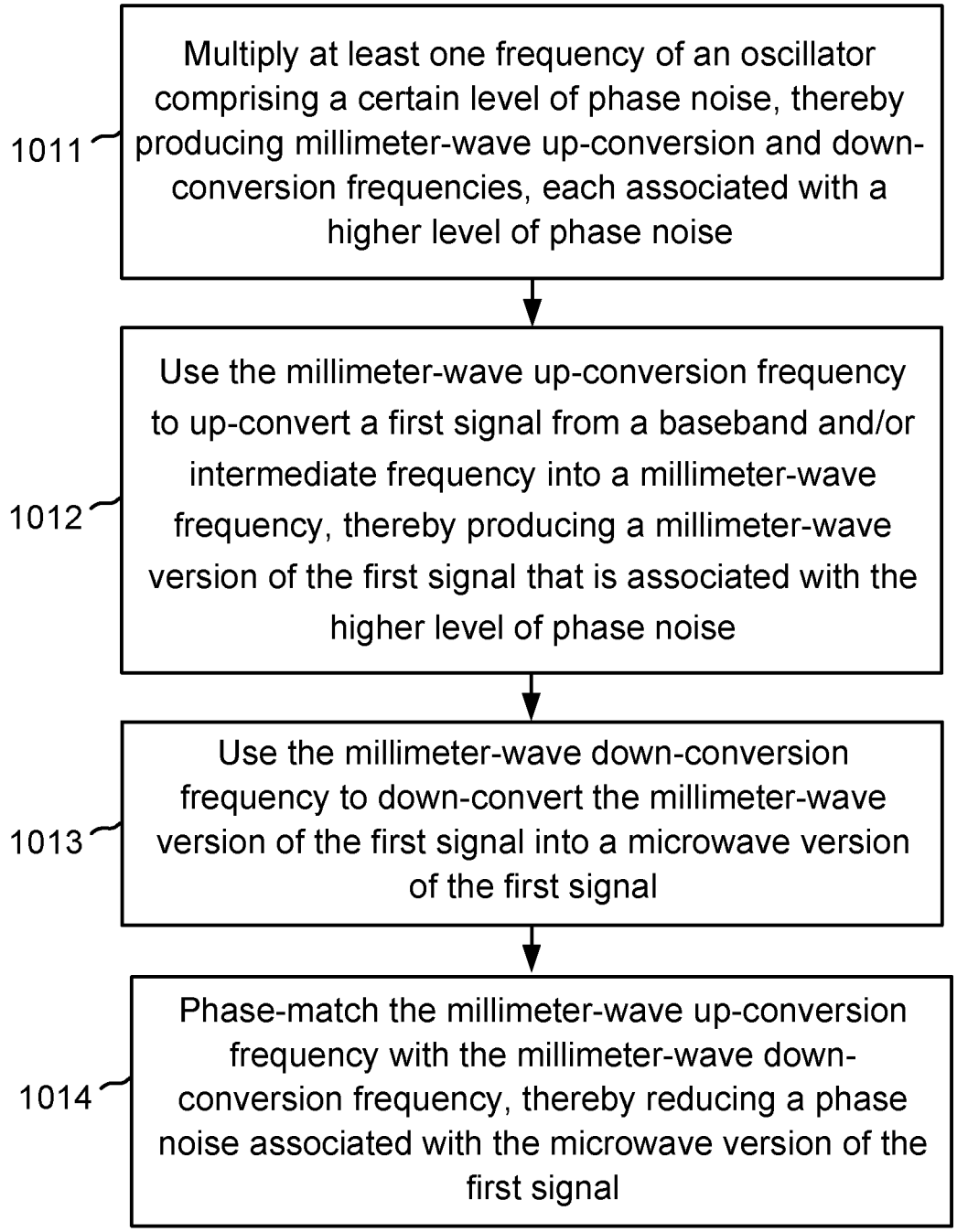
FIG. 5 illustrates one embodiment of a method for generating a specific exact frequency differential between a first millimeter-wave frequency and a second millimeter-wave frequency.

FIG. 5 illustrates one embodiment of a method for generating a specific exact frequency differential between a first millimeter-wave frequency and a second millimeter-wave frequency. The method includes: in step 1011: multiplying a frequency associated with a single microwave oscillator 1-VCO (FIG. 4A) comprising a certain level of phase noise, thereby producing a millimeter-wave up-conversion frequency 1-ref-1 (FIG. 4A, FIG. 4B) associated with a higher level of phase noise; and multiplying a frequency associated with the single microwave oscillator 1-VCO, thereby producing a millimeter-wave down-conversion frequency 1-ref-2 (FIG. 4A, FIG. 4B) associated with the higher level of phase noise. In step 1012: obtaining a first signal 1-bb-1 (FIG. 4B) in a baseband and/or intermediate frequency; and using the millimeter-wave up-conversion frequency 1-ref-1 to up-convert the first signal 1-bb-1 from said baseband and/or intermediate frequency into a millimeter-wave frequency, thereby producing a millimeter-wave version 1-mmw-2 of the first signal that is associated with the higher level of phase noise. In step 1013: using the millimeter-wave down-conversion frequency 1-ref-2 to down-convert the millimeter-wave version 1-mmw-2 of the first signal into a microwave version 1-Mw-3 of the first signal. In step 1014: phase-matching the millimeter-wave up-conversion frequency 1-ref-1 with the millimeter-wave down-conversion frequency 1-ref-2, thereby reducing a phase noise associated with the microwave version 1-Mw-3 of the first signal optionally to a level associated with the single microwave oscillator 1-VCO.

In one embodiment, said certain level of phase noise is below an integrated phase noise level of −35 dBc (minus thirty-five decibel-carrier) as measured in conjunction with a bandwidth associated with the microwave version of the first signal 1-Mw-3; and said higher level of phase noise is above an integrated phase noise level of −35 dBc as measured in conjunction with a bandwidth associated with the microwave version of the first signal 1-Mw-3.

In one embodiment, the millimeter-wave down-conversion frequency 1-ref-2 is above 18 GHz (eighteen gigahertz); the millimeter-wave up-conversion frequency 1-ref-1 is above the millimeter-wave down-conversion frequency; the microwave version 1-Mw-3 of the first signal is associated with a frequency that is equal to the difference 2-differential (FIG. 4B) between the millimeter-wave up-conversion frequency 1-ref-1 and the millimeter-wave down-conversion frequency 1-ref-2; the difference 2-differential between the millimeter-wave up-conversion frequency 1-ref-1 and the millimeter-wave down-conversion frequency 1-ref-2 is below 7 GHz (sever gigahertz); and the higher level of phase noise is at least 10 dB (ten decibel) higher than the certain level of phase noise.

In this description, numerous specific details are set forth. However, the embodiments/cases of the invention may be practiced without some of these specific details. In other instances, well-known hardware, materials, structures and techniques have not been shown in detail in order not to obscure the understanding of this description. In this description, references to "one embodiment" and "one case" mean that the feature being referred to may be included in at least one embodiment/case of the invention. Moreover, separate references to "one embodiment", "some embodiments", "one case", or "some cases" in this description do not necessarily refer to the same embodiment/case. Illustrated embodiments/cases are not mutually exclusive, unless so stated and except as will be readily apparent to those of ordinary skill in the art. Thus, the invention may include any variety of combinations and/or integrations of the features of the embodiments/cases described herein. Also herein, flow diagrams illustrate non-limiting embodiment/case examples of the methods, and block diagrams illustrate non-limiting embodiment/case examples of the devices. Some operations in the flow diagrams may be described with reference to the embodiments/cases illustrated by the block diagrams. However, the methods of the flow diagrams could be performed by embodiments/cases of the invention other than those discussed with reference to the block diagrams, and embodiments/cases discussed with reference to the block diagrams could perform operations different from those discussed with reference to the flow diagrams. Moreover, although the flow diagrams may depict serial operations, certain embodiments/cases could perform certain operations in parallel and/or in different orders from those depicted. Moreover, the use of repeated reference numerals and/or letters in the text and/or drawings is for the purpose of simplicity and clarity and does not in itself dictate a relationship between the various embodiments/cases and/or configurations discussed. Furthermore, methods and mechanisms of the embodiments/cases will sometimes be described in singular form for clarity. However, some embodiments/cases may include multiple iterations of a method or multiple instantiations of a mechanism unless noted otherwise. For example, when a controller or an interface are disclosed in an embodiment/case, the scope of the embodiment/case is intended to also cover the use of multiple controllers or interfaces.

Certain features of the embodiments/cases, which may have been, for clarity, described in the context of separate embodiments/cases, may also be provided in various combinations in a single embodiment/case. Conversely, various features of the embodiments/cases, which may have been, for brevity, described in the context of a single embodiment/case, may also be provided separately or in any suitable sub-combination. The embodiments/cases are not limited in their applications to the details of the order or sequence of steps of operation of methods, or to details of implementation of devices, set in the description, drawings, or examples. In addition, individual blocks illustrated in the figures may be functional in nature and do not necessarily correspond to discrete hardware elements. While the methods disclosed herein have been described and shown with reference to particular steps performed in a particular order, it is understood that these steps may be combined, subdivided, or reordered to form an equivalent method without departing from the teachings of the embodiments/cases. Accordingly, unless specifically indicated herein, the order and grouping of the steps is not a limitation of the embodiments/cases. Embodiments/cases described in conjunction with specific examples are presented by way of example, and not limitation. Moreover, it is evident that many alternatives, modifications and variations will be apparent to those skilled in the art. Accordingly, it is intended to embrace all such alternatives, modifications and variations that fall within the spirit and scope of the appended claims and their equivalents.

What is claimed is:

1. A system operative to generate a specific exact frequency differential between a first millimeter-wave frequency and a second millimeter-wave frequency, comprising:
   a single oscillator; and
   a frequency alteration mechanism comprising at least a first frequency multiplier;
   wherein:
   the system is configured to use the single oscillator in conjunction with the frequency alteration mechanism to generate a first millimeter-wave frequency that is above 18 GHz (eighteen gigahertz);
   the system is further configured to use the single oscillator, again, in conjunction with the frequency alteration mechanism to generate a second millimeter-wave frequency that is below the first millimeter-wave frequency but still above 18 GHz, so as to create a specific exact frequency differential between the first millimeter-wave frequency and a second millimeter-wave frequency, in which the first millimeter-wave frequency and a second millimeter-wave frequency are at least partially phase-correlated as a result of being generated from the single oscillator; and
   both said first millimeter-wave frequency and second millimeter-wave frequency are associated with a millimeter-wave phase noise that is above a certain noise level, however the specific exact frequency differential is associated with a phase noise that is below said certain noise level as a direct result of said phase-correlation, and is therefore usable for generating a certain signal associated with a certain baseband and/or intermediate frequency.

2. The system of claim 1, further comprising:
   a first millimeter-wave chain operative to up-convert signals from a baseband and/or intermediate frequency into a millimeter-wave frequency; and
   a second millimeter-wave chain operative to down-convert signals from a millimeter-wave frequency into a baseband and/or intermediate frequency;
   wherein as a part of said generation of the certain signal, the system is configured to:
   obtain a first signal in a first baseband and/or intermediate frequency;
   use the first millimeter-wave chain, in conjunction with the first millimeter-wave frequency acting as up-conversion frequency, to up-convert the first signal from said first baseband and/or intermediate frequency into a millimeter-wave frequency, thereby producing a millimeter-wave version of the first signal; and
   use the second millimeter-wave chain, in conjunction with the second millimeter-wave frequency acting as down-conversion frequency, to down-convert the millimeter-wave version of the first signal into the certain signal having a frequency associated with the specific exact frequency differential, in which the certain signal is associated with said phase noise that is below said certain noise level.

3. The system of claim 2, wherein:
   the first millimeter-wave frequency and a second millimeter-wave frequency are fully phase-correlated as a combined result of (i) being generated from the single oscillator and (ii) being phase-matched between said up-conversion and said down-conversion, thereby at least partially canceling phase noise introduced during said up-conversion with phase noise introduced during said down-conversion.

4. The system of claim 3, wherein as part of said phase-matching, the system is further configured to:
   adjust a phase of the up-conversion frequency relative to a phase of the down-conversion frequency, until reaching a certain desirable phase noise level associated with the certain signal.

5. The system of claim 4, wherein said desirable phase noise level is below an integrated phase noise of −45 dBc (minus forty-five decibel-carrier), in which the integrated phase noise is measured/integrated over a bandwidth associated with the certain signal.

6. The system of claim 1, wherein:
   both said first millimeter-wave frequency and second millimeter-wave frequency are associated with an integrated phase noise of above −35 dBc (minus thirty-five decibel-carrier) as measured in conjunction with a bandwidth associated with the certain signal; and
   as a direct result of said phase-correlation, the specific exact frequency differential is associated with an integrated phase noise of below −35 dBc as measured in conjunction with a bandwidth associated with the certain signal.

7. The system of claim 6, wherein:
   the certain signal and the specific exact frequency differential are both associated with a frequency below 7 GHz (seven gigahertz); and
   the certain signal is associated with said integrated phase noise of below −35 dBc as measured in conjunction with a bandwidth associated with the certain signal.

8. The system of claim 7, wherein:
   the certain signal is associated with a QAM256 and/or higher modulation transmission; and
   the specific exact frequency differential and the certain signal are associated with an integrated phase noise of below −45 dBc (minus forty-five decibel-carrier) as measured in conjunction with a bandwidth associated with the certain signal.

9. The system of claim 8, wherein both said first millimeter-wave frequency and second millimeter-wave frequency are associated with an integrated phase noise of above −30 dBc (minus thirty decibel-carrier) as measured in conjunction with a bandwidth associated with the certain signal.

10. The system of claim 7, wherein the certain signal is associated with a QAM64 transmission; and
the specific exact frequency differential is associated with an integrated phase noise of below −40 dBc (minus forty decibel-carrier) as measured in conjunction with a bandwidth associated with the certain signal.

11. The system of claim 1, wherein the certain signal is associated with frequencies selected from a group consisting of: (i) frequencies in the 1.7 GHz to 1.9 GHz cellular band, (ii) frequencies in the 2.1 GHz to 2.4 GHz cellular band, (iii) frequencies in the 2.4 GHz ism band, (iv) frequencies in the 2.5 GHz cellular band, (v) frequencies in the 3.6 GHz cellular band, and (vi) frequencies in the 5 GHz to 5.8 GHz ism band.

12. The system of claim 1, wherein the certain signal is associated with a communication standard selected from a group consisting of: (i) LTE, (ii) 5G, and (iii) WiFi.

13. The system of claim 1, wherein:
the frequency alteration mechanism further comprises a second frequency multiplier;
as part of said generation of the first millimeter-wave frequency, the frequency alteration mechanism is configured to use the first frequency multiplier to multiply a frequency associated with the single oscillator; and
as part of said generation of the second millimeter-wave frequency, the frequency alteration mechanism is configured to use the second frequency multiplier to multiply a frequency associated with the same single oscillator, in which as a result of said frequency multiplications, both said first millimeter-wave frequency and second millimeter-wave frequency are associated with a millimeter-wave phase noise that is above the certain noise level.

14. A method for generating a specific exact frequency differential between a first millimeter-wave frequency and a second millimeter-wave frequency, comprising:
multiplying a frequency associated with a single microwave oscillator comprising a certain level of phase noise, thereby producing a millimeter-wave up-conversion frequency associated with a higher level of phase noise;
multiplying a frequency associated with the single microwave oscillator, thereby producing a millimeter-wave down-conversion frequency associated with the higher level of phase noise;
obtaining a first signal in a baseband and/or intermediate frequency;
using the millimeter-wave up-conversion frequency to up-convert the first signal from said baseband and/or intermediate frequency into a millimeter-wave frequency, thereby producing a millimeter-wave version of the first signal that is associated with the higher level of phase noise;
using the millimeter-wave down-conversion frequency to down-convert the millimeter-wave version of the first signal into a microwave version of the first signal; and
phase-matching the millimeter-wave up-conversion frequency with the millimeter-wave down-conversion frequency, thereby reducing a phase noise associated with the microwave version of the first signal to a level associated with the single microwave oscillator.

15. The method of claim 14, wherein:
said certain level of phase noise is below an integrated phase noise level of −35 dBc (minus thirty-five decibel-carrier) as measured in conjunction with a bandwidth associated with the microwave version of the first signal; and
said higher level of phase noise is above an integrated phase noise level of −35 dBc as measured in conjunction with a bandwidth associated with the microwave version of the first signal.

16. The method of claim 14, wherein:
the millimeter-wave down-conversion frequency is above 18 GHz (eighteen gigahertz);
the millimeter-wave up-conversion frequency is above the millimeter-wave down-conversion frequency;
the microwave version of the first signal is associated with a frequency that is equal to the difference between the millimeter-wave up-conversion frequency and the millimeter-wave down-conversion frequency;
the difference between the millimeter-wave up-conversion frequency and the millimeter-wave down-conversion frequency is below 7 GHz (sever gigahertz); and
the higher level of phase noise is at least 10 dB (ten decibel) higher than the certain level of phase noise.

* * * * *